(12) United States Patent
Weiss et al.

(10) Patent No.: US 8,387,105 B1
(45) Date of Patent: Feb. 26, 2013

(54) METHOD AND A SYSTEM FOR TRANSMITTING VIDEO STREAMS

(75) Inventors: Tal Weiss, Ness Ziona (IL); Alon Shafrir, Kfar Saba (IL); Amotz Hoshen, Ramat Gan (IL)

(73) Assignee: ARRIS Solutions, Inc., Suwanee, GA (US)

( * ) Notice: Subject to any disclaimer, the term of this patent is extended or adjusted under 35 U.S.C. 154(b) by 318 days.

(21) Appl. No.: 12/652,080

(22) Filed: Jan. 5, 2010

Related U.S. Application Data

(60) Provisional application No. 61/142,394, filed on Jan. 5, 2009, provisional application No. 61/221,108, filed on Jun. 29, 2009.

(51) Int. Cl.
*H04N 9/74* (2006.01)
*H04N 7/173* (2011.01)
*H04N 7/12* (2006.01)
*H04N 7/10* (2006.01)

(52) U.S. Cl. ........... 725/131; 725/90; 725/135; 348/586

(58) Field of Classification Search .................. 348/586; 725/136, 139, 59, 90, 131, 135
See application file for complete search history.

(56) References Cited

U.S. PATENT DOCUMENTS

| | | | |
|---|---|---|---|
| 5,859,660 A * | 1/1999 | Perkins et al. .................. | 725/32 |
| 5,917,830 A * | 6/1999 | Chen et al. .................... | 370/487 |
| 6,122,660 A * | 9/2000 | Baransky et al. ............. | 709/217 |
| 6,678,332 B1 * | 1/2004 | Gardere et al. .......... | 375/240.26 |
| 2002/0129374 A1* | 9/2002 | Freeman et al. ................ | 725/91 |
| 2005/0022245 A1* | 1/2005 | Nallur et al. .................... | 725/88 |
| 2011/0138426 A1* | 6/2011 | Schwab et al. .................. | 725/59 |

* cited by examiner

*Primary Examiner* — Pankaj Kumar
*Assistant Examiner* — Reuben M Brown
(74) *Attorney, Agent, or Firm* — Troy A. Van Aacken; Robert J. Starr

(57) ABSTRACT

A system and a method for facilitating transitions between video streams is provided. The method includes the steps of: (i) receiving a primary video stream that includes a first primary video stream portion and a second primary video stream portion, wherein the second stream portion follows the first primary video stream portion; (ii) receiving a secondary video stream; processing at least one of the primary video stream and the secondary video stream to facilitate a seamless transition, at a multiple tuner device, between the first primary video stream portion and the secondary video stream; (iii) transmitting the primary video stream to a first tuner of the multiple tuner device; (iv) transmitting the secondary video stream to a second tuner of the multiple tuner device; and (v) instructing the multiple tuner device to perform a seamless transition between the first primary video stream portion to the secondary video stream.

12 Claims, 13 Drawing Sheets

400 converting, by the first tuner, radio frequency signals that convey a third primary video stream portion of the primary video stream to third decoder compliant video signals.
810 decoding the third decoder compliant video signals and to output third decoded signals.
820 performing, by the switch of the multiple tuner device, another seamless transition, wherein the other seamless transition is between the secondary decoded signals and the third decoded signals.
830 providing the third decoded signals to the display.
840

800

FIG.8 instructing multiple transmitters to transmit multiple video streams according to a current allocation scheme.
910 changing the current allocation scheme to provide a next allocation scheme so that a primary video stream transmitted over a first channel by a first transmitter will be replaced by a secondary video stream that is transmitted over a second channel by a second transmitter.
920 instructing the multiple transmitters to transmit multiple video streams according to the next allocation scheme.
930 instructing a system that is coupled to a multiple tuner device to transmit the primary video stream over the first channel to a first tuner of the multiple tuner device, to transmit the secondary video stream over a second channel to a second tuner of the multiple tuner device and to transmit a seamless transition instruction to the multiple tuner device between the primary video stream and the secondary video stream.
940

```
┌─────────────────────────────────────────────────────────────────────────┐
│ receiving an instruction to transmit multiple video streams according   │
│ to a current allocation scheme.                                         │
│                                  1010                                   │
└─────────────────────────────────────────────────────────────────────────┘
                                    │
┌─────────────────────────────────────────────────────────────────────────┐
│ transmitting multiple video streams according to the current            │
│ allocation scheme by multiple transmitters.                             │
│                                  1020                                   │
└─────────────────────────────────────────────────────────────────────────┘
                                    │
┌─────────────────────────────────────────────────────────────────────────┐
│ receiving an instruction to transmit multiple video streams according   │
│ to a next allocation scheme so that a primary video stream transmitted  │
│ over a first channel by a first transmitter will be replaced by a       │
│ secondary video stream that is transmitted over a second channel by     │
│ a second transmitter.                                                   │
│                                  1030                                   │
└─────────────────────────────────────────────────────────────────────────┘
                                    │
┌─────────────────────────────────────────────────────────────────────────┐
│ transmitting multiple video streams according to the next allocation    │
│ scheme by the multiple transmitters.                                    │
│                                  1040                                   │
└─────────────────────────────────────────────────────────────────────────┘
                                    │
┌─────────────────────────────────────────────────────────────────────────┐
│ instructing a system that is coupled to a multiple tuner device to      │
│ transmit the primary video stream over the first channel to a first     │
│ tuner of the multiple tuner device, to transmit the secondary video     │
│ stream over a second channel to a second tuner of the multiple tuner    │
│ device and to transmit a seamless transition instruction to the         │
│ multiple tuner device between the primary video stream and the          │
│ secondary video stream.                                                 │
│                                  1050                                   │
└─────────────────────────────────────────────────────────────────────────┘

METHOD AND A SYSTEM FOR TRANSMITTING VIDEO STREAMS

RELATED APPLICATIONS

This application claims priority from U.S. Provisional Patent Ser. No. 61/142,394, filing date Jan. 5, 2009; titled "Method And System For Providing Content" and from U.S. Provisional Patent Ser. No. 61/221,108, filing date Jun. 29, 2009; titled "A Method and a System for Transmitting Video Streams" and which are incorporated herein by reference in its entirety.

BACKGROUND OF THE INVENTION

Targeted advertisement includes transmitting advertisements to users (also referred to as subscribers or viewers) according to end user parameters.

Video broadcasters (e.g. cable operators) wish to deliver different advertisements to different subscribers that may be watching the same program. Subscribers of cable operators receive the content by set-top-boxes (STB) that have radio frequency tuners that are configured to tune into the physical channel over which a desired program is being transmitted.

The broadcaster controls multiple physical channels, each having a limited bandwidth.

There is therefore a need to deliver the advertisements in an efficient manner while minimizing network bandwidth allocated for the transmission of advertisements.

There are various prior art method for providing targeted advertisements to a user.

One prior art method includes generating different programs that differ from each other only by the advertisements included in each program. For example, a certain television show can be included in multiple different programs that differ from each other only by the advertisements they include.

It is noted that in addition to the high bandwidth consumption of such a solution there may be another problem—if a user is tuned into a channel delivering a specific version for a first advertisement, he will get for other advertisements the versions that are delivered on the same channel without the ability to get other versions for them (since it will require to re-tune to other channels.

A second prior art method includes broadcasting advertisement over one or more dedicated channels and broadcasting programs over other channels. When an advertisement break starts a tuner of the set top box is instructed to tune to the advertisement channel and when the advertisement break ends the tuner is instructed to re-tune to the channel that conveys the program. This tuning is time consuming and can cause noticeable interruption in the video signal, due to the set top box inherent latency in the tuning process and the need to wait until an I-Frame is received.

A third prior art includes delivering different advertisements over a channel wherein each advertisement is associated with a unique identifier (such as a unique PID). This requires an inclusion of a large amount of advertisement information in the channel The physical channel that carries the multi-PID program could carry limited number of concurrent streams, and since each stream has high bitrate the delivery of several programs may require many physical channels.

A fourth prior art method includes uni-casting the programs to the subscribers. Each subscriber will receive a unique channel that includes a unique advertisement. This method is bandwidth consuming.

SUMMARY

A method for facilitating transitions between video streams is provided. The method includes: receiving a primary video stream that comprises a first primary video stream portion and a second primary video stream portion, wherein the second stream portion follows the first video stream portion; receiving a secondary video stream; processing at least one of the primary video stream and the secondary video stream to facilitate a seamless transition, at a multiple tuner device, between the first primary video stream portion and the secondary video stream; transmitting the primary video stream to a first tuner of the multiple tuner device; transmitting the secondary video stream to a second tuner of the multiple tuner device; and instructing the multiple tuner device to perform a seamless transition between the first primary video stream portion to the secondary video stream.

The primary video stream may include a first synchronization point and the secondary video stream may include a second synchronization point. The method may include instructing the multiple tuner device to perform the seamless transition if the multiple tuner device detects the first and second synchronization points.

Each of the first and second synchronization points can be identified by a predefined content of a private field of an adaptation field.

The method may include transmitting the secondary video stream substantially in parallel to the transmitting of the second primary video stream portion. The method may include preventing a transmission of video content to the second tuner before starting the transmitting of the secondary video stream.

The second primary video stream portion and the secondary video stream may be different versions of a same content.

The second primary video stream portion and the secondary video stream may differ from each other by at least one parameter out of bit rate and quality.

The second primary video stream portion may be targeted to a user of the multiple tuner device. The secondary video stream may be targeted to another user.

The method may include: receiving a primary video stream that includes the first and second primary video stream portions and a third primary video stream portion, wherein the third primary video stream portion follows the second primary video stream portion; receiving the secondary video stream; processing at least one of the primary video stream and the secondary video stream to facilitate a seamless transition, at a multiple tuner device, between the first primary video stream portion and the secondary video stream and facilitates a seamless transition, at the multiple tuner device, between the secondary video stream and the third primary video stream portion; transmitting the primary video stream to the first tuner of the multiple tuner device; transmitting the secondary video stream to the second tuner of the multiple tuner device; instructing the multiple tuner device to perform a seamless transition between the first primary video stream portion to the secondary video stream; and instructing the multiple tuner device to perform a seamless transition between the secondary video stream to the third primary video stream portion.

The method may include transmitting the secondary video stream substantially in parallel to the transmitting of the second primary video stream portion; and preventing a transmission of video content to the second tuner during a transmitting of the first and third primary video stream portions to the second tuner.

The method may include preventing a transmission of video content to the second tuner during most of the transmitting of the first and third primary video stream portions to the second tuner.

The method may include transmitting the primary video stream to a first tuner of the multiple tuner device over a radio frequency link, wherein the multiple tuner device is a multiple tuner set top box.

A system for facilitating transitions between video streams can be provided. The system may include: a receiver to receive a secondary video stream and to receive a primary video stream; the primary video stream comprises a first primary video stream portion and a second primary video stream portion, wherein the second stream portion follows the first video stream portion; a video processor to process at least one of the primary video stream and the secondary video stream to facilitate a seamless transition, at a multiple tuner device, between the first primary video stream portion and the secondary video stream; a transmitter to transmit the primary video stream to a first tuner of the multiple tuner device, for transmitting the secondary video stream to a second tuner of the multiple tuner device and for transmitting a seamless transition instruction to the multiple tuner device, wherein the seamless transition instruction instructs the multiple tuner device to perform a seamless transition between the first primary video stream portion to the secondary video stream.

The primary video stream may include a first synchronization point and the secondary video stream may include a second synchronization point. The system may be configured to transmit a seamless transition instruction that instructs the multiple tuner device to perform the seamless transition if the multiple tuner device detects the first and second synchronization points.

Each of the first and second synchronization points may be identified by a predefined content of a private field of an adaptation field.

The transmitter may be configured to transmit the secondary video stream substantially in parallel to a transmission of the second primary video stream portion; and the system may be configured to prevent a transmission of video content to the second tuner before the transmitter starts a transmission of the secondary video stream.

The second primary video stream portion and the secondary video stream may be different versions of a same content.

The second primary video stream portion and the secondary video stream may differ from each other by at least one parameter out of bit rate and quality.

The second primary video stream portion may be targeted to a user of the multiple tuner device. The secondary video stream may be targeted to another user.

The receiver may be further configured to receive a third primary video stream portion of the primary video stream. The third primary video stream portion follows the second primary video stream portion;

The video processor may be configured to process at least one out of the primary video stream and the secondary video stream to facilitate another seamless transition, at the multiple tuner device, wherein the other seamless transition may be between the secondary video stream and the third primary video stream portion. The transmitter may be further configured to transmit another seamless transition instruction to the multiple tuner device. The other seamless transition instruction instructs the multiple tuner device to perform a seamless transition between the secondary video stream and the third primary video stream portion.

The transmitter may be adapted to transmit the secondary video stream substantially in parallel to a transmission of the second primary video stream portion. The system may be configured to prevent the transmitter from transmitting video content to the second tuner during a transmission of the first and third primary video stream portions to the second tuner.

The system may be configured to prevent the transmitter from transmitting video content to the second tuner during most of a transmission of the first and third primary video stream portions to the second tuner.

A method for seamless transition between video streams is provided. The method may include: converting, by a first tuner of a multiple tuner device, radio frequency signals that convey a first primary video stream portion of a primary video stream to first decoder compliant video signals; converting, by the first tuner, a second primary video stream portion of a primary video stream to second decoder compliant video signals; converting, by a second tuner of the multiple tuner device, radio frequency signals that convey a secondary video stream to secondary decoder compliant video signals; decoding, by a first decoder of the multiple tuner device, the first and the second decoder compliant video signals and outputting first and second decoded signals; decoding, by a second decoder of the multiple tuner device, the secondary decoder compliant video signals and outputting secondary decoded signals; sending to a display the first decoded signals; instructing a switch of the multiple tuner device to perform a seamless transition between the first decoded signals and the secondary decoded signals; performing, by the switch, the seamless transition between the first decoded signals and the secondary decoded signals; and providing the secondary decoded signals to the display.

The primary video stream may include a first synchronization point and the secondary video stream comprises a second synchronization point. The controller may instruct the switch to perform the seamless transition if the controller detects the first and second synchronization points.

The first tuner may be configured to convert radio frequency signals that convey a third primary video stream portion of the primary video stream to third decoder compliant video signals. The first decoder may be configured to decode the third decoder compliant video signals and to output third decoded signals. The switch may be configured to perform another seamless transition. The other seamless transition may be between the secondary decoded signals and the third decoded signals and to provide the third decoded signals to the display.

The controller can be configured to instruct the switch to perform the other seamless transition.

A multiple tuner device can be provided. The multiple tuner device may include: a first tuner to convert radio frequency signals that convey a first primary video stream portion of a primary video stream to first decoder compliant video signals, and for converting a second primary video stream portion of the primary video stream to second decoder compliant video signals; a second tuner to convert radio frequency signals that convey a secondary video stream to secondary decoder compliant video signals; a first decoder to decode the first and the second decoder compliant video signals and to output first and second decoded signals; a second decoder to decode the secondary decoder compliant video signals and for outputting secondary decoded signals; a switch, coupled to the first decoder and to the second decoder, to send to a display the first decoded signals, to perform a seamless transition between the first decoded signals and the secondary decoded signals and to provide the secondary decoded signals to the display; and a controller, to instruct the switch to perform the seamless transition.

The primary video stream may include a first synchronization point and the secondary video stream may include a second synchronization point. A controller of the multiple tuner device may be adapted to instruct the switch to perform the seamless transition if the controller detects the first and second synchronization points.

A first tuner may be configured to convert radio frequency signals that convey a third primary video stream portion of the primary video stream to third decoder compliant video signals. The first decoder may be configured to decode the third decoder compliant video signals and to output third decoded signals. The switch may be configured to perform another seamless transition, wherein the other seamless transition may be between the secondary decoded signals and the third decoded signals and to provide the third decoded signals to the display. The controller may be configured to instruct the switch to perform the other seamless transition.

A method for seamless transition between video streams can be provided. The method may include: converting, by a first tuner of a multiple tuner device, radio frequency signals that convey a first primary video stream portion of a primary video stream to first decoder compliant video signals; converting, by the first tuner, a second primary video stream portion of a primary video stream to second decoder compliant video signals; converting, by a second tuner of the multiple tuner device, radio frequency signals that convey a secondary video stream to secondary decoder compliant video signals; sending to a decoder of the multiple tuner device the first decoder compliant video signals; decoding by the decoder the first decoder compliant video signals to provide first decoded signals and sending the first decoded signals to a display; performing, by a switch of the multiple tuner device a seamless transition between the first decoder compliant video signals and the secondary decoder compliant signals; sending to the decoder of the multiple tuner device the secondary decoder compliant video signals; and decoding by the decoder the secondary decoder compliant video signals to provide secondary decoded signals and sending the secondary decoded signals to the display.

The primary video stream may include a first synchronization point and the secondary video stream may include a second synchronization point. The method may include instructing the switch to perform the seamless transition if the controller detects the first and second synchronization points.

The method may include: converting, by the first tuner, radio frequency signals that convey a third primary video stream portion of the primary video stream to third decoder compliant video signals; decoding the third decoder compliant video signals and to output third decoded signals; and performing, by the switch of the multiple tuner device, another seamless transition, wherein the other seamless transition may be between the secondary decoded signals and the third decoded signals and to provide the third decoded signals to the display.

A multiple tuner device can be provided. The multiple tuner device may include: a first tuner to convert radio frequency signals that convey a first primary video stream portion of a primary video stream to first decoder compliant video signals, and to convert a second primary video stream portion of a primary video stream to second decoder compliant video signals; a second tuner to convert radio frequency signals that convey a secondary video stream to secondary decoder compliant video signals; a switch, coupled to the first tuner and to the second tuner, to send to a decoder of the multiple tuner device the first decoder compliant video signals, to perform a seamless transition between the first decoder compliant signals and the secondary decoder compliant signals, and to provide the secondary decoder compliant signals to the decoder; a decoder to decode the first decoder compliant video signals to provide first decoded signals to be sent to a display; and to decode the secondary decoder compliant video signals to provide secondary decoded signals to be sent to the display; and a controller, to instruct the switch to perform the seamless transition.

The primary video stream may include a first synchronization point and the secondary video stream may include a second synchronization point at the secondary video stream. The controller may be to instruct the switch to perform the seamless transition if the controller detects the first and second synchronization points.

The first tuner may be further configured to convert radio frequency signals that convey a third primary video stream portion of the primary video stream to third decoder compliant video signals. The switch may be configured to perform another seamless transition, wherein the other seamless transition may be between the secondary decoder compliant signals and the third decoder compliant signals and to provide the third decoder compliant signals to the decoder. The decoder may be further configured to decode the third decoder compliant video signals to provide third decoded signals to be sent to the display.

A method for managing multiple transmitters is provided. The method may include: instructing the multiple transmitters to transmit multiple video streams according to a current allocation scheme; changing the current allocation scheme to provide a next allocation scheme so that a primary video stream transmitted over a first channel by a first transmitter will be replaced by a secondary video stream that may be transmitted over a second channel by a second transmitter; instructing the multiple transmitters to transmit multiple video streams according to the next allocation scheme; instructing a system that may be coupled to a multiple tuner device to transmit the primary video stream over the first channel to a first tuner of the multiple tuner device, to transmit the secondary video stream over a second channel to a second tuner of the multiple tuner device and to transmit a seamless transition instruction to the multiple tuner device between the primary video stream and the secondary video stream.

The secondary video stream and the primary video stream may be different versions of a same content.

The secondary video stream and the primary video stream differ from each other by at least one parameter out of bit rate and quality.

A session manager is provided. It may include: a transmitter to transmit instructions to multiple transmitters that instruct the multiple transmitters to transmit multiple video streams according to a current allocation scheme; a controller to change the current allocation scheme to provide a next allocation scheme so that a primary video stream transmitted over a first channel by a first transmitter will be replaced by a secondary video stream that may be transmitted over a second channel by a second transmitter; wherein the transmitter may be further configured to transmit instructions to multiple transmitters that instruct the multiple transmitters to transmit multiple video streams according to the next allocation scheme; wherein the transmitter may be further configured to transmit instructions to a system that may be coupled to a multiple tuner device that instruct the system to transmit the primary video stream over the first channel to a first tuner of the multiple tuner device, to transmit the secondary video stream over a second channel to a second tuner of the multiple tuner device and to transmit a seamless transition instruction to the multiple tuner device between the primary video stream and the secondary video stream.

A transmitter array is provided, it may include: an interface to receive an instruction to transmit multiple video streams according to a current allocation scheme; multiple transmitters to transmit multiple video streams according to the current allocation scheme; wherein the interface may be further configured to receive an instruction to transmit multiple video streams according to a next allocation scheme so that a primary video stream transmitted over a first channel by a first transmitter will be replaced by a secondary video stream that may be transmitted over a second channel by a second transmitter; wherein the multiple transmitters may be further configured to transmit multiple video streams according to the next allocation scheme; wherein at least one transmitter of the multiple transmitters may be configured to transmit instructions to a system that may be coupled to a multiple tuner device that instructs the system to transmit the primary video stream over the first channel to a first tuner of the multiple tuner device, to transmit the secondary video stream over a second channel to a second tuner of the multiple tuner device and to transmit a seamless transition instruction to the multiple tuner device between the primary video stream and the secondary video stream.

A method may be provided. The method may include: receiving a primary media stream and a secondary media stream, each media stream includes video and media frames; receiving a cut off indication indicative of a scheduled transition, at a cut off point, between the primary and secondary media streams; generating a processed media stream that comprises at least one primary audio frame that follows the cut off point, secondary audio frames and secondary video frames; and transmitting the processed media stream.

The method may include generating a processed media stream in which the first audio frames may be primary audio frames.

The method may include generating a processed media stream in the first audio frames and secondary video frames may be arranged in an interlaced manner.

A system for facilitating transitions between video streams is provided. The system may include: a receiver to receive a secondary media stream, a primary media stream and a cut off indication indicative of a scheduled transition, at a cut off point, between the primary and secondary media streams; a video processor, to generate a processed media stream that comprises at least one primary audio frame that follows the cut off point, secondary audio frames and secondary video frames; and a transmitter to transmit the processed media stream.

Each of the first and second synchronization points may be identified by including a same picture.

Each of the first and second synchronization points may be identified by including a same picture.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 is a flow diagram of a method for seamless transition between video streams, according an embodiment of the invention;

FIG. 9 is a flow diagram of a method for managing multiple transmitters, according an embodiment of the invention;

FIG. 10 is a flow diagram of a method for managing multiple transmitters, according an embodiment of the invention.

Figure 1:
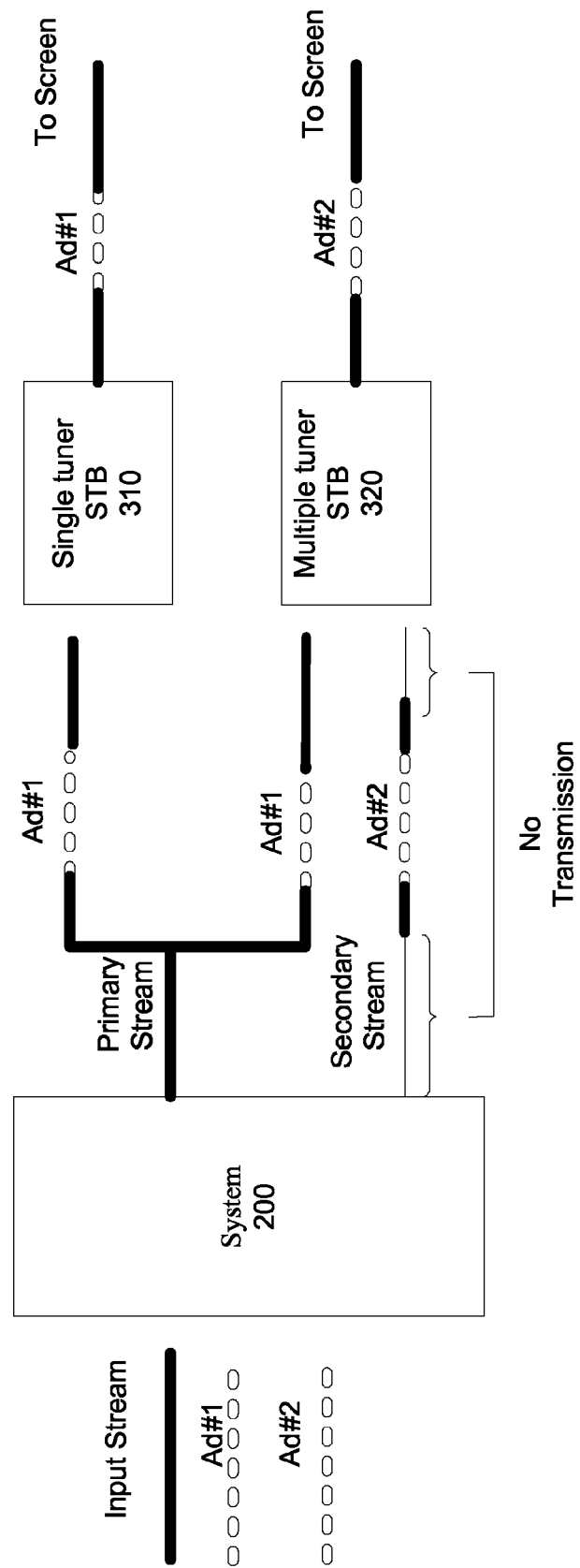
FIG. 1 illustrates a system for video transmission, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The invention relates to systems and methods for transmitting video streams, and especially to systems and methods for seamless transitions between video streams The methods and systems herein disclosed implements transmission of advertisements (hereinbelow also referred to as ads) while reducing the necessity to transmit several copies of the video stream prior and following the advertisement. It is noted that those systems and methods may also be used for transmission of transition between other types of videos, which are not of similar commercial use.

The herein disclosed systems and methods reduce the bandwidth required in addressable advertising transmission, while performing seamless transition between video streams, by using a multi tuner device such as a multiple tuner set top box.

It is noted the disclosed techniques may also be used for an efficient video transmission in application where the transmission bandwidth is dynamically allocated to services, such as switched-broadcast. The techniques apply to transmission of any multimedia stream (e.g. video with audio) where data must be received fully and with correct timing to allow correct presentation.

FIG. 1 illustrates system 200 for video transmission, according to an embodiment of the invention. It is noted that system 200 may transmit the video streams to either single tuner set top boxes such as STB 310, as well as to at least one multiple tuner set top box such as STB 320, which includes two or more tuners.

According to an embodiment of the invention, a transmission module of system 200 may start a transmission of a secondary (alternate) video stream to multiple tuner STB 320, while the STB 320 is using one tuner to receive a first video stream ("Primary"), wherein the alternate video stream ("Secondary") may be tuned/encoded so as to enable receiving by another tuner of STB 320.

According to an embodiment of the invention, a software of STB 320 (or other component of which) will send signals to a display that will cause the display to start displaying the secondary video stream in a synchronized way, without the latency involved in re-tuning and without the need to wait for an I-Frame. The same technique can be used to switch back to the primary stream.

According to an embodiment of the invention, system 200 is adapted to provide (and possibly to generate and/or to manipulate at least one of) the first and the secondary video streams, so that an alternation between the streams at specific synchronization points, results with a video stream with no visible artifacts. According to an embodiment of the invention, this manipulation may include insertion of pre-defined information which enables the STB to identify such synchronization points.

It should be noted that the advertisement portion of the second stream is conveniently different than the advertisement portion of the first stream. Also, conveniently, the second stream may be transmitted to the STB only a short time prior to the ad, and this transmission may stop a short time after the end of the advertisement.

According to various embodiments of the invention, various alternatives for seamless transition between the Primary and the Secondary streams may be implemented, e.g. depending on the set top box.

STB 320 can be instructed to perform a seamless transition between video streams in various manners. For example, it can receive from system 200 (or from a session manager located elsewhere) messages instructing STB 320 to search for synchronization points and to perform a seamless transition between video streams once these synchronization point are found.

An example for a message which causes STB 320 to tune to another program is a "ProgramSelectIndication" message of a DSM-CC SDB-CCP protocol.

The STB 320 can be instructed to perform a seamless transition if the system 200 is aware that STB has available tuners. The availability of tuners can be monitored by system 200 in various manners. For example, it can be assumed that at an initialization stage of STB 320 that its tuner are available. Tracking after the programs requested by STB 320 can indicate whether tuners of STB 320 are free. Alternatively, STB 320 can send status messages indicative of an availability of its tuners. System 200 can send queries to STB 320 asking STB 320 to provide an indication about an availability of its tuners and system 200 may respond to system 200 by providing a status report.

An example for such a status query and such a status report are the "SDBQueryRequest" and the "SDBQueryResponse" messages in NGOD protocol.

Set Top Boxes with Multiple Tuners and Single Video Decoder

System 200 processes (manipulates) at least one of the Primary and Secondary streams, preparing synchronization points, and transmits them to the set top boxes. For example, according to an embodiment of the invention, in MPEG2 Transport Stream, the Primary and Secondary streams may both include a specific transport-packet, which is the first packet of a video frame with the same Presentation Time Stamps, and holds the same Program Counter Reference value in both streams. This transport-packet can be marked in both streams (e.g. by including an adaptation field with identical PCR and a private data field) and will be used as the synchronization point for alternating between the Primary and Secondary streams.

The STB software (or other component of STB 320) will implement a mechanism which identifies the corresponding synchronization points of the Primary and Secondary streams, stop feeding the video decoder with the Primary stream, and start feeding the Secondary stream to the decoder at that point.

According to an embodiment of the invention, resynchronization of the two streams may be carried out, if the streams are not received by STB 320 in a synchronized manner.

According to some embodiments of the invention, if the two streams are not perfectly synchronized at the STB input, synchronization will be made by either the STB, or by the pre-processing unit, or both.

For example, using a delay buffer, the STB can handle timing differences between the streams.

If should be mentioned that in most cases, the STB would need to re-stamp timing values (PCR, PTS and DTS values) prior to feeding the decoder with the Secondary stream.

According to an embodiment of the invention system 200 generate (instead of two synchronous or "identical" synchronization point) an earlier "out point" and a later "in point.

Assuming that the term "current" denotes the video stream which is currently being watched and the term "next" denotes the video stream to which the STB will tune to. The system 200 will guarantee that the out-point of "current" is transmitted before in-point of "next". In the gap between the out-point and the in-point the transmitter can send to the decoder duplicating frames or null packets.

Figure 2:
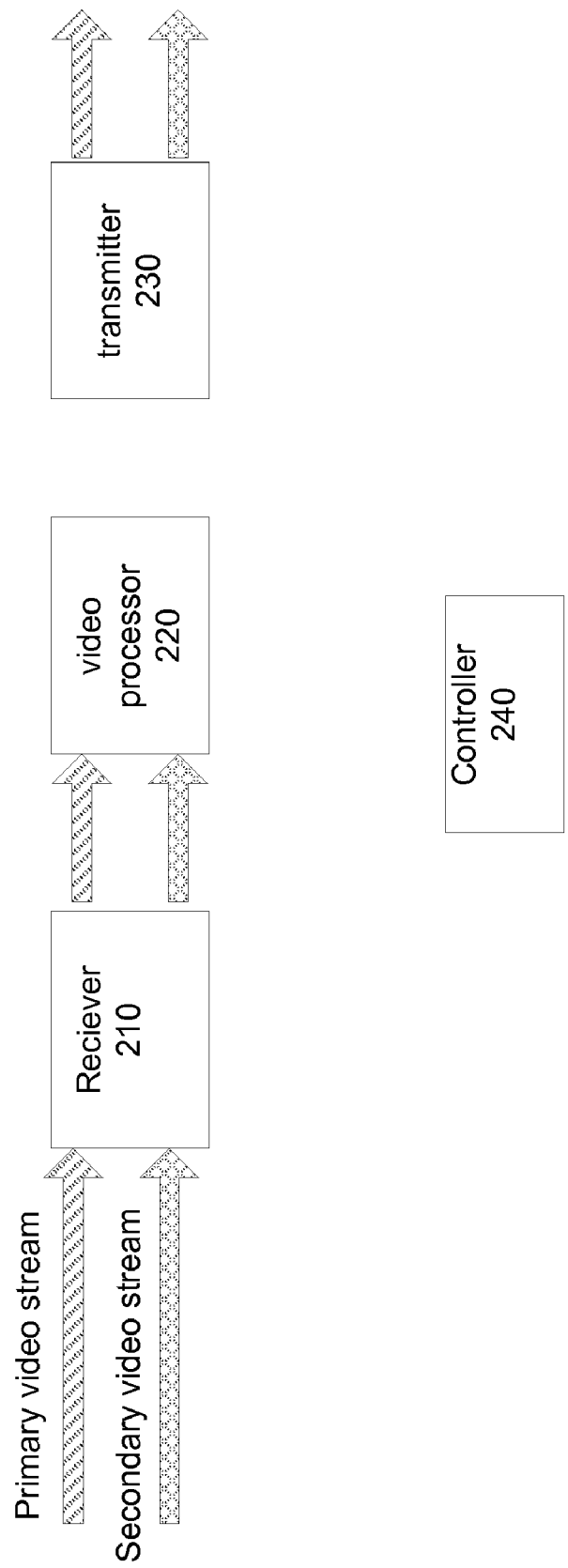
FIG. 2 illustrates a system for video transmission, according to an embodiment of the invention.

FIG. 2 illustrates in greater details system 200 according to an embodiment of the invention.

System 200 includes receiver 210, video processor 220, transmitter 230 and controller 240.

System 200 can be an edge device and many systems such as system 200 can be fed by video streams under the control of a session manager.

Receiver 210 is configured to receive a secondary video stream and receive a primary video stream. The primary video stream includes a first primary video stream portion and a second primary video stream portion, wherein the second stream portion follows the first video stream portion; the second primary video stream portion can be an advertisement but this is not necessarily so.

Video processor 220 is adapted to process at least one of the primary video stream and the secondary video stream to facilitate a seamless transition, at a multiple tuner device, between the first primary video stream portion and the secondary video stream. It generates a legal video stream that includes the first primary video stream portion that is followed by the secondary video stream. This legal video stream is not expected to generate visual artifacts due to the transition between the first primary video stream portion and the secondary stream.

Transmitter 230 is configured transmit the primary video stream to a first tuner of the multiple tuner device, transmit the secondary video stream to a second tuner of the multiple tuner device and transmit a seamless transition instruction to the multiple tuner device. It is noted that the transition instruction can be sent via a session manager and not via the transmitter. The seamless transition instruction instructs the multiple tuner device to perform a seamless transition between the first primary video stream portion to the secondary video stream.

The primary video stream may include a first synchronization point and the secondary video stream may include a second synchronization point.

System 200 may be configured to transmit a seamless transition instruction that instructs the multiple tuner device to perform the seamless transition if the multiple tuner device detects the first and second synchronization points.

As mentioned above, each of the first and second synchronization points can be identified by a predefined content of a private field of an adaptation field.

The transmitter 230 may be configured to transmit the secondary video stream substantially in parallel to a transmission of the second primary video stream portion. System 200 can be configured to prevent a transmission of video content (for example—by not transmitting such video content) to the second tuner before the transmitter starts a transmission of the secondary video stream.

The second primary video stream portion and the secondary video stream can be different versions of a same content.

The second primary video stream portion and the secondary video stream can differ from each other by at least one parameter out of bit rate and quality.

The second primary video stream portion may be targeted to a user of the multiple tuner device and the secondary video stream may be targeted to another user.

The receiver 210 may be further configured to receive a third primary video stream portion of the primary video stream. The third primary video stream portion follows the second primary video stream portion.

The video processor 220 may be configured to process at least one of the secondary video stream and the third video portion to facilitate another seamless transition, at the multiple tuner device, wherein the other seamless transition is between the secondary video stream and the third primary video stream portion.

The transmitter 230 may be further configured to transmit another seamless transition instruction to the multiple tuner device, wherein the other seamless transition instruction instructs the multiple tuner device to perform a seamless transition between the secondary video stream and the third primary video stream portion.

The transmitter 230 may be configured to transmit the secondary video stream substantially in parallel to a transmission of the second primary video stream portion.

System 200 may be configured to prevent the transmitter from transmitting video content to the second tuner during a transmission of the first and third primary video stream portions to the second tuner or at least during most of the transmission of the first and third primary video stream portions to the second tuner.

Figure 3:
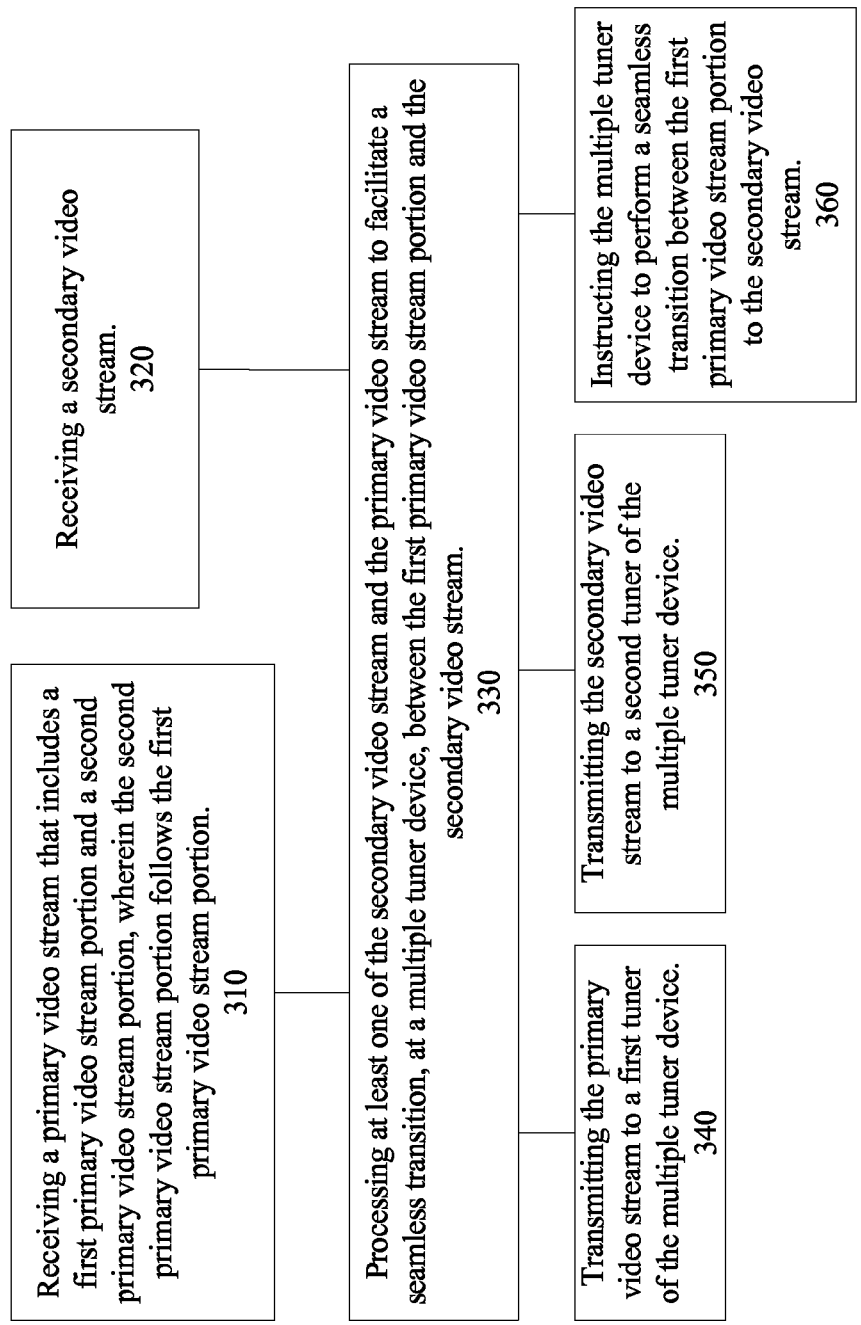
FIG. 3 is a flow diagram of a method for facilitating transitions between video streams, according to an embodiment of the invention.

FIG. 3 illustrates method 300 for facilitating transitions between video streams, according to an embodiment of the invention.

Method 300 starts by stages 310 and 320.

Stage 310 includes receiving a primary video stream that includes a first primary video stream portion and a second primary video stream portion, wherein the second stream portion follows the first primary video stream portion.

Stage 320 includes receiving a secondary video stream.

Stages 310 and 320 are followed by stage 330.

Stage 330 includes processing at least one of the secondary video stream and the primary video stream to facilitate a seamless transition, at a multiple tuner device, between the first primary video stream portion and the secondary video stream.

Stage 330 is followed stages 340, 350 and 360.

Stage 340 includes transmitting the primary video stream to a first tuner of the multiple tuner device.

Stage 350 includes transmitting the secondary video stream to a second tuner of the multiple tuner device.

Stage 360 includes instructing the multiple tuner device to perform a seamless transition between the first primary video stream portion to the secondary video stream.

The primary video stream may include a first synchronization point and the secondary video stream may include a second synchronization point. Each of the first and second synchronization points may be identified by a predefined content of a private field of an adaptation field of a MPEG transport Stream header.

Stage 360 may include instructing the multiple tuner device to perform the seamless transition if the multiple tuner device detects the first and second synchronization points.

Stage 350 of transmitting the secondary video stream can be executed substantially in parallel to the transmitting of the second primary video stream portion (of stage 340). Method 300 may further include preventing a transmission of video content to the second tuner before starting the transmitting of the secondary video stream.

Figure 4:
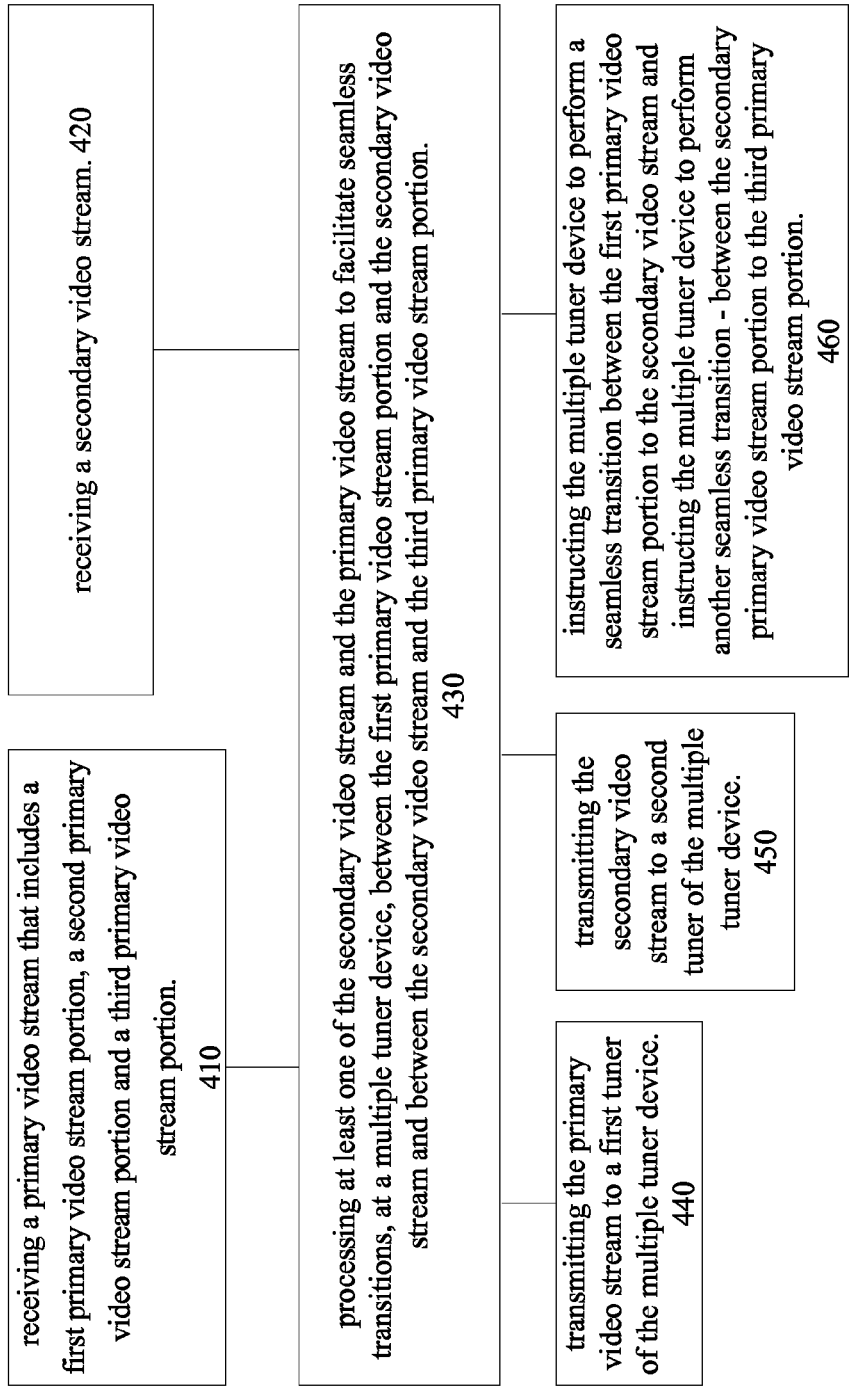
FIG. 4 is a flow diagram of a method for facilitating transitions between video streams, according to an embodiment of the invention.

FIG. 4 illustrates method 400 for facilitating transitions between video streams, according to an embodiment of the invention.

Method 400 starts by stages 410 and 420.

Stage 410 includes receiving a primary video stream that includes a first primary video stream portion, a second primary video stream portion and a third primary video stream portion. The second stream portion follows the first primary video stream portion and the third primary video stream portion follows the second primary video stream portion.

Stage 420 includes receiving a secondary video stream.

Stages 410 and 420 are followed by stage 430.

Stage 430 includes processing at least one of the secondary video stream and the primary video stream to facilitate seamless transitions, at a multiple tuner device, between the first primary video stream portion and the secondary video stream and between the secondary video stream and the third primary video stream portion.

Stage 430 is followed stages 440, 450 and 460.

Stage 440 includes transmitting the primary video stream to a first tuner of the multiple tuner device.

Stage 450 includes transmitting the secondary video stream to a second tuner of the multiple tuner device.

Stage 460 includes instructing the multiple tuner device to perform a seamless transition between the first primary video stream portion to the secondary video stream and instructing the multiple tuner device to perform another seamless transition—between the secondary primary video stream portion to the third primary video stream portion.

The primary video stream may include a first synchronization point and the secondary video stream may include a second synchronization point. Each of the first and second synchronization points may be identified by a predefined content of a private field of an adaptation field of a MPEG transport Stream header.

Stage 460 may include instructing the multiple tuner device to perform the seamless transition if the multiple tuner device detects the first and second synchronization points.

Stage 450 of transmitting the secondary video stream can be executed substantially in parallel to the transmitting of the second primary video stream portion (of stage 440). Method 400 may further include preventing a transmission of video content to the second tuner during the transmissions (or at least during most of the transmission) of the first and third primary video stream portions.

Stages 440, 450 and 460 may include transmitting the primary video stream to a first tuner of the multiple tuner device over a radio frequency link, wherein the multiple tuner device is a multiple tuner set top box.

Figure 5:
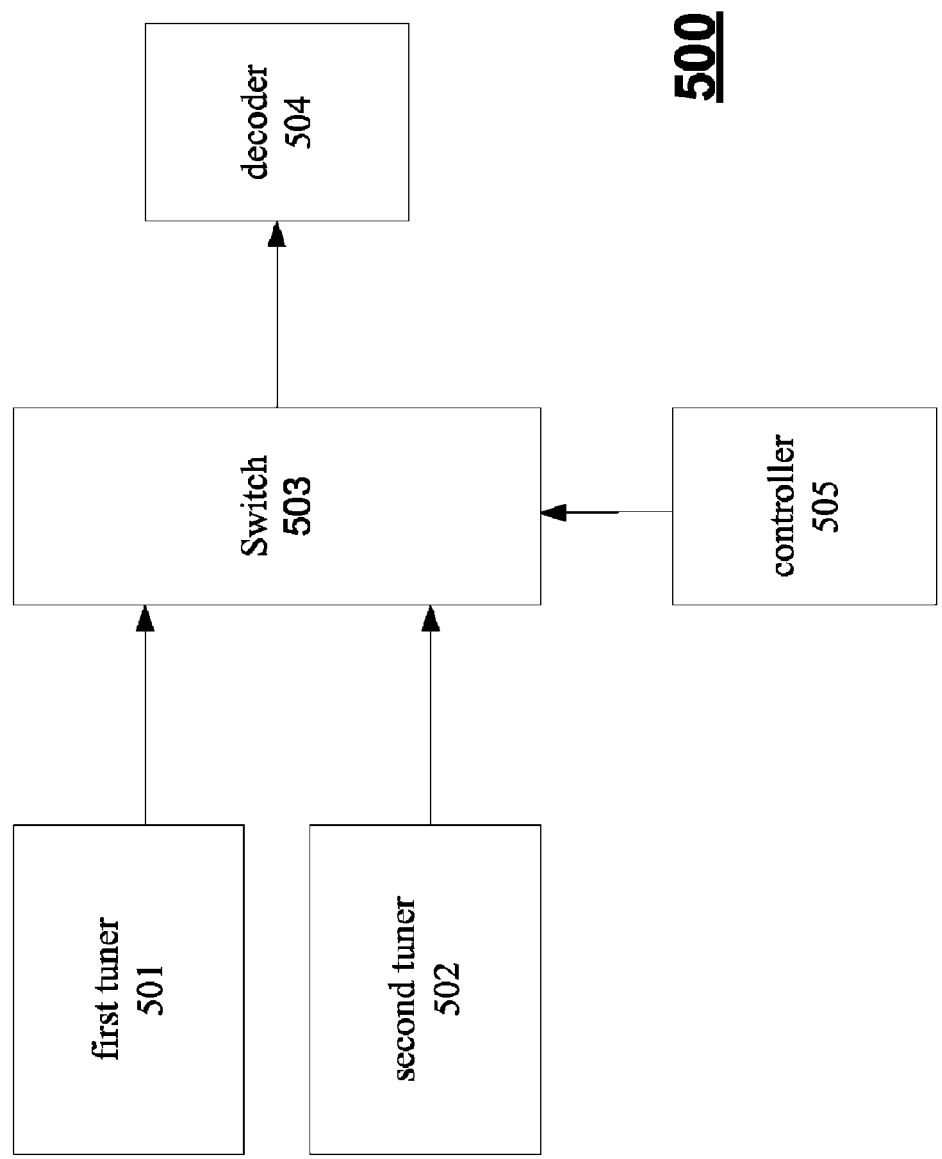
FIG. 5 is a block diagram that illustrates a multiple tuner and single decoder set top box.

FIG. 5 illustrates a multiple tuner and single decoder set top box 500, according to one such embodiment of the invention.

System 200 according to such an embodiment of the invention may manipulate the primary and secondary streams for generating a synchronization point where both streams encode the same content with identical presentation-time. System 200 will transmit them to the STB. For example, in MPEG2 TS this point may be identified by having the same picture in the primary and secondary streams.

Small time gaps between the two decoders could be mitigated either by using a delay-buffer in the STB or by using black/transparent frames in scene transitions. STB software (or other component of the STB) will implement a mechanism which identifies the synchronization point on the decoded stream.

When the synchronization point is identified, STB software will switch the video decoder used to display the video on the subscriber's screen. The subscriber will get a video stream combined from the Primary and Secondary streams without visual artifacts. For example, when the presentation time of a black/transparent frame arrives in the primary stream, then the software agent switches between the decoders' outputs.

Multiple tuner device 500 includes: (i) a first tuner 501 for converting radio frequency signals that convey a first primary video stream portion of a primary video stream to first decoder compliant video signals, and for converting a second primary video stream portion of a primary video stream to second decoder compliant video signals; (ii) a second tuner 502 for converting radio frequency signals that convey a secondary video stream to secondary decoder compliant video signals; (iii) a switch 503, coupled to the first tuner and to the second tuner, for sending to a decoder of the multiple tuner device the first decoder compliant video signals, for performing a seamless transition between the first decoder compliant signals and the secondary decoder compliant signals, and for providing the secondary decoder compliant signals to the decoder; (iv) a decoder 504 for decoding the first decoder compliant video signals to provide first decoded signals to be sent to a display; and for decoding the secondary decoder compliant video signals to provide secondary decoded signals to be sent to the display; and (v) a controller 505, for instructing the switch 503 to perform the seamless transition.

The primary video stream may include a first synchronization point and the secondary video stream comprises a second synchronization point. The controller 505 may instructs the switch 503 to perform the seamless transition if the controller 505 detects the first and second synchronization points.

The first tuner 502 may be further configured to convert radio frequency signals that convey a third primary video stream portion of the primary video stream to third decoder compliant video signals.

The switch 503 may be configured to perform another seamless transition, wherein the other seamless transition is between the secondary decoder compliant signals and the third decoder compliant signals and to provide the third decoder compliant signals to the decoder.

The decoder 504 may be further configured to decode the third decoder compliant video signals to provide third decoded signals to be sent to the display.

Figure 6:
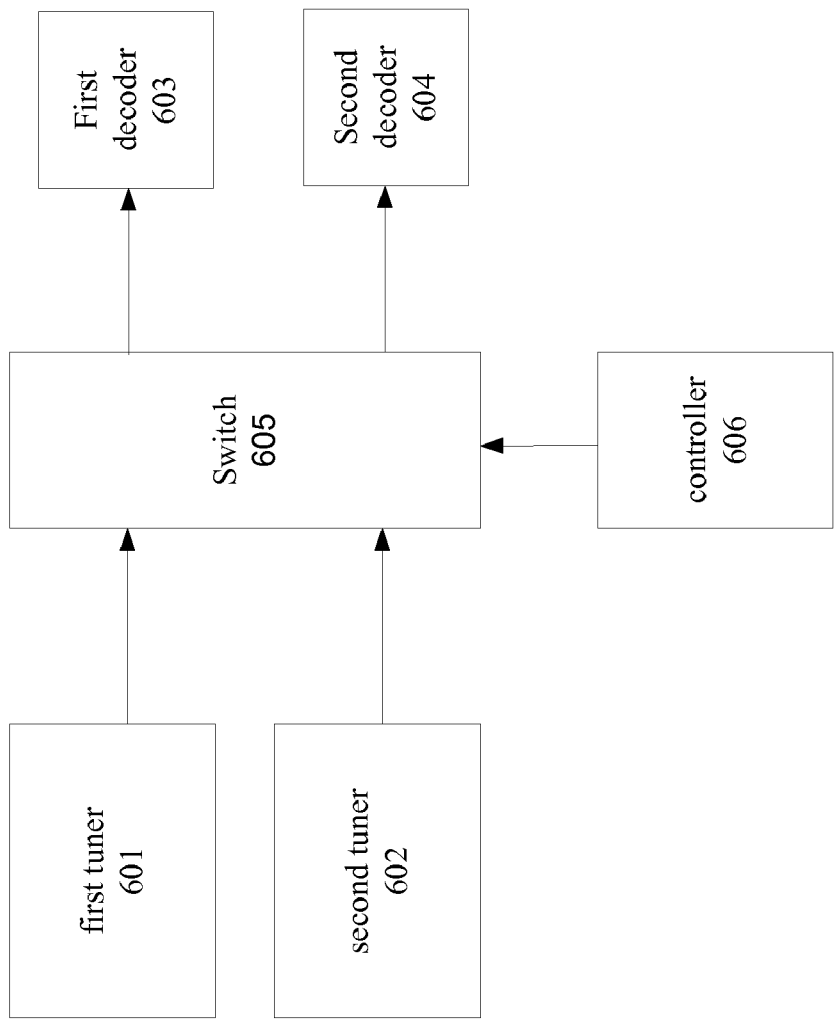
FIG. 6 is a block diagram that illustrates a multiple tuner device that includes multiple decoders, according an embodiment of the invention.

FIG. 6 illustrates a multiple tuner device 600 that includes multiple decoders according an embodiment of the invention. Multiple tuner device 600 includes: (i) a first tuner 601 for converting radio frequency signals that convey a first primary video stream portion of a primary video stream to first decoder compliant video signals, and for converting a second primary video stream portion of a primary video stream to second decoder compliant video signals; (ii) a second tuner 602 for converting radio frequency signals that convey a secondary video stream to secondary decoder compliant video signals; (iii) a first decoder 603 for decoding the first and the second decoder compliant video signals and for outputting first and second decoded signals; (iv) a second decoder 604 for decoding the processed decoder compliant video signals and for outputting secondary decoded signals; (v) a switch 605, coupled to the first decoder 603 and to the second decoder 604, for sending to a display the first decoded signals, performing a seamless transition between the first decoded signals and the secondary decoded signals and for providing the secondary decoded signals to the display; and (vi) a controller 606, for instructing the switch to perform the seamless transition.

The primary video stream may include a first synchronization point and the secondary video stream comprises a second synchronization point. The controller 606 may instructs the switch 604 to perform the seamless transition if the controller 606 detects the first and second synchronization points.

The first tuner 601 may be configured to convert radio frequency signals that convey a third primary video stream portion of the primary video stream to third decoder compliant video signals.

The first decoder 603 may be configured to decode the third decoder compliant video signals and to output third decoded signals.

The switch 605 may be configured to perform another seamless transition, wherein the other seamless transition is between the secondary decoded signals and the third decoded signals and to provide the third decoded signals to the display.

The controller 606 may be configured to instruct the switch 605 to perform the other seamless transition.

Figure 7:
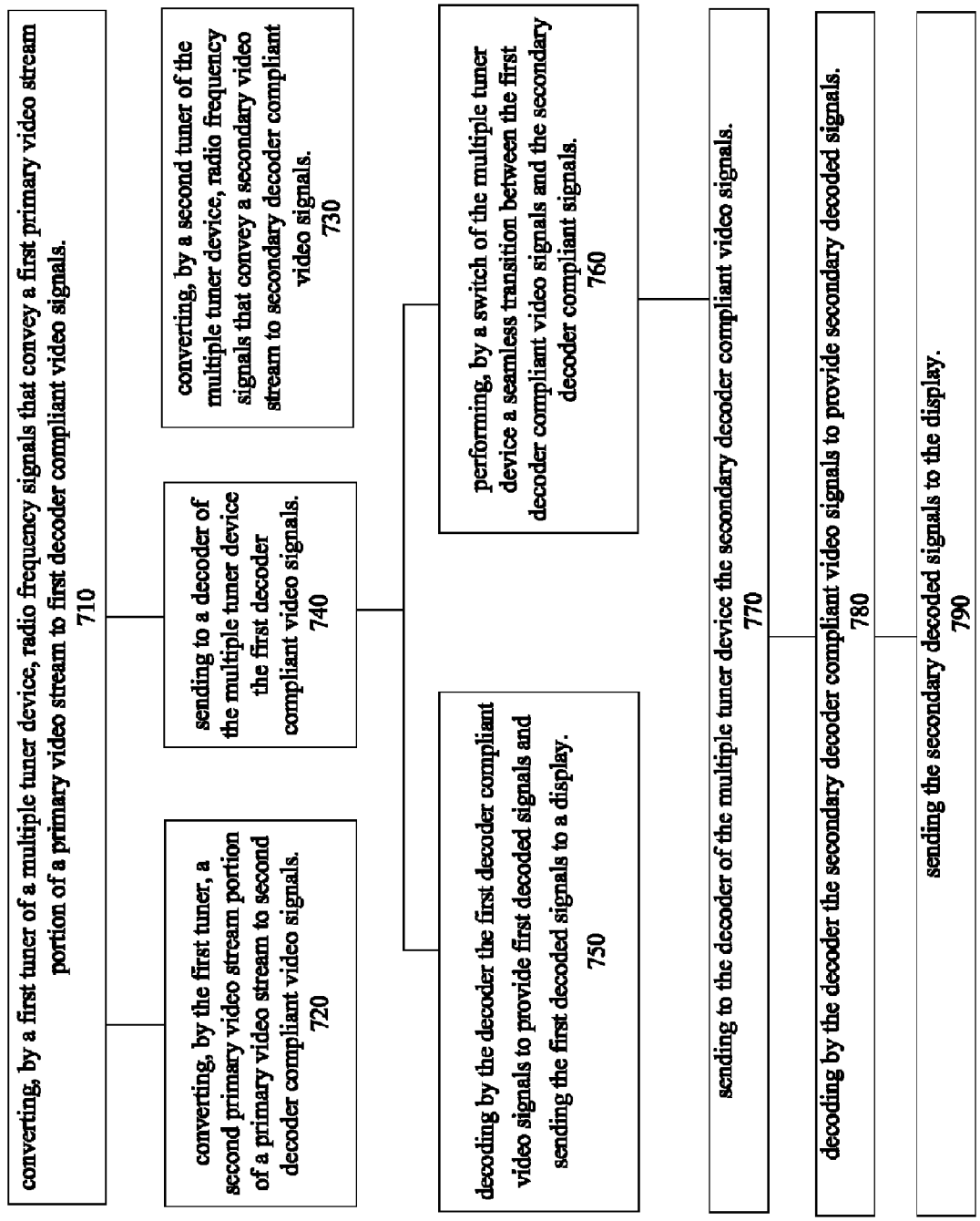
FIG. 7 is a flow diagram of a method for seamless transition between video streams, according an embodiment of the invention.

FIG. 7 illustrates a method 700 for seamless transition between video streams according an embodiment of the invention.

Method 700 starts by stage 710 of converting, by a first tuner of a multiple tuner device, radio frequency signals that convey a first primary video stream portion of a primary video stream to first decoder compliant video signals.

Stage 710 is followed by stage 720 of converting, by the first tuner, a second primary video stream portion of a primary video stream to second decoder compliant video signals.

Method 700 also includes stage 730 that can start substantially when stage 720 begins. It may start slightly before stage 720 begins. Small timing differences between the beginning of these stages can be compensated by buffers of the multiple tuner device.

Stage 730 includes converting, by a second tuner of the multiple tuner device, radio frequency signals that convey a secondary video stream to secondary decoder compliant video signals.

Stage 710 is also followed by stage 740 of sending to a decoder of the multiple tuner device the first decoder compliant video signals.

Stage 740 is followed by stage 750 of decoding by the decoder the first decoder compliant video signals to provide first decoded signals and sending the first decoded signals to a display.

Stage 740 is also followed by stage 760 of performing, by a switch of the multiple tuner device a seamless transition between the first decoder compliant video signals and the secondary decoder compliant signals.

Stage 760 is followed by stage 770 of sending to the decoder of the multiple tuner device the secondary decoder compliant video signals.

Stage 770 is followed by stage 780 of decoding by the decoder the secondary decoder compliant video signals to provide secondary decoded signals.

Stage 780 is followed by stage 790 of sending the secondary decoded signals to the display.

FIG. 8 illustrates a method 800 for seamless transition between video streams according an embodiment of the invention.

Method 800 differs from method 700 by including additional stages.

Stage 810 includes converting, by the first tuner, radio frequency signals that convey a third primary video stream portion of the primary video stream to third decoder compliant video signals. Stage 810 follows stage 720. It may also follow stages such as stages 760 and 770.

Stage 810 is followed by stage 820 of decoding the third decoder compliant video signals and to output third decoded signals.

Stage 820 is followed by stage 830 of performing, by the switch of the multiple tuner device, another seamless transition, wherein the other seamless transition is between the secondary decoded signals and the third decoded signals.

Stage 830 is followed by stage 840 of providing the third decoded signals to the display.

Session Manager Coordinating Between Multiple Tuners

According to an embodiment system 200 may check if a second tuner of a multiple tuner device is free before deciding to send the primary and secondary video streams to the multiple tuner device.

It is noted that, according to an embodiment of the invention, the herein disclosed methods and systems may be used for seamless de-fragmentation in applications where bandwidth is dynamically allocated to services Referring, by way of example, to applications that dynamically allocate bandwidth to currently watched multimedia sessions (e.g. Video on Demand, SDV). Since bandwidth is divided to limited physical channels, used sessions can become poorly organized in channels. It can be desirable to re-allocate sessions between physical channels (e.g. to make room for a high-bit rate session, or to free up a specific physical channel having unique capabilities).

The herein disclosed systems and methods may therefore also be used in such applications, by changing the transmission parameters of a watched program, in a seamless way. In that case, the Session Manager may initialize a new session on a different physical channel, which will carry the same program.

Dual-input STBs will be instructed to tune to that new session with a second tuner, and switch internally the input source (on a designated switching-point) in order to continue displaying the video stream. This will be done in a seamless manner. The Session Manager will then be able to stop the original session from being transmitted, and by doing that it will free the needed bandwidth in the physical channel.

According to an embodiment of the invention, a method for video transmission is provided, including: transmitting a primary video stream, that includes a source video portion, and starting to transmit—when transmitting the primary video stream—a secondary video stream that starts with a copy video portion, wherein the copy video portion is a copy of the source video portion (possibly in different quality and/or encoding). It is noted that referring to the advertisement examples above, the source video portion and the copy video portions may be the video portions directly before the different advertisements.

Conveniently, the method includes transmitting the two video streams to a single STB having two or more tuners. Alternatively, one or both of the video streams may be transmitted to the STB via one or more intermediary systems, wherein the video streams includes either an address of the STB, information which enables identification of the STB as target for routing, and/or information detectable by the STB itself.

Conveniently, the method may include transmitting the two video streams wherein each video stream of the two streams includes at least one synchronization point for synchronizing between the two streams.

It is noted that the primary video stream may include a first video portion (e.g. a first advertisement) and the second video portion may include a second video portion (e.g. a second advertisement) which are different from each other.

According to an embodiment of the invention, the primary video stream may include a second source portion and the secondary video stream may include a second copy portion at the end of the secondary video stream. According to an embodiment of the invention, the second copy portion may end the secondary video stream.

According to an embodiment of the invention, the method may include ceasing to transmit the secondary video stream after the transmission of the second copy portion.

According to an embodiment of the invention, the copy portion (and/or the second copy portion) are relatively short in relation to the second video portion (e.g. less than a second, e.g. in a 1:100 ratio, and so forth).

According to an embodiment of the invention, an STB is disclosed, the STB includes two or more tuners, and at least one output interface for outputting an output video stream (e.g. to a TV).

The STB is configured to receive the primary video stream using a first tuner, and to start receiving the secondary video stream using a second tuner. The STB is configured (e.g. a processor of which) to generate the output video stream in response to the primary video stream (e.g. a duplication of which until some point in time), and to switch for including information from the secondary video stream in the output video stream. The STB may determine when to switch to the secondary video stream in response to synchronization points of the two video streams (while not necessarily switching at a synchronization point). Conveniently, the switching includes switching to the secondary video stream in an I-Frame of the secondary video stream (which should not necessarily be parallel to an I-frame of the primary video stream).

The STB may switch back for including information of the primary video stream in the output video stream (E.g. in the aforementioned advertising scenario), but this is not necessarily so (e.g. in the quality of transmission scenario above).

According to an embodiment of the invention, a method for processing video streams is provided, the method including receiving the first and the secondary video streams using different tuners of a single STB, and providing an output video stream by the STB wherein the output video stream includes information of the first stream until a switching point, from which it includes information of the secondary video stream. The method may be extended to implement other functionalities of the STB, e.g. as discussed above.

It is noted that the herein disclosed systems and methods allow flexibility in choosing the physical channel to be used as a transmission channel for the advertisement. This flexibility allows much more efficient use of BW compared to solutions where ad must be on same channel as the primary. For example, a cable operator can even save equipment costs by transmitting advertisements on centralized broadcast channels instead of using switched-broadcast channels.

It is noted that the herein disclosed systems and methods efficient use of network bandwidth for addressable advertising, since multiple streams are delivered only around ad break and not all the time. Addressable advertising solution will benefit from this approach, since ad-breaks for different programs are in different times. Therefore, given the same bandwidth, more addressable ads could be transmitted as opposed to full switched unicast approach.

The amount of bandwidth required during advertisement breaks (holding few advertisement slots), is also reduced. This is since the broadcaster can deliver only the number of variants per ad-slot, as opposed to delivering a session per subscriber or a session per combination of ad-slots during an ad break.

It is noted that the herein disclosed systems and methods can facilitate seamless transition when: (i) Moving to watch the same program on a different physical channel, (ii) Switching from primary program to an advertisement, (iii) Switching from one ad to another during an ad break, and (iv) Switching from ad back to a primary program at the end of a break.

It is noted that the herein disclosed systems and methods may be used to enhance flexibility and enable reorganization of sessions to physical channels for applications such as SDV and VoD.

FIG. 9 illustrates a method 900 for managing multiple transmitters, according to an embodiment of the invention.

Method 900 includes stage 910 of instructing multiple transmitters to transmit multiple video streams according to a current allocation scheme.

Stage 910 is followed by stage 920 of changing the current allocation scheme to provide a next allocation scheme so that a primary video stream transmitted over a first channel by a first transmitter will be replaced by a secondary video stream that is transmitted over a second channel by a second transmitter.

Stage 920 is followed by stage 930 of instructing the multiple transmitters to transmit multiple video streams according to the next allocation scheme.

Stage 930 is followed by stage 940 of instructing a system that is coupled to a multiple tuner device to transmit the primary video stream over the first channel to a first tuner of the multiple tuner device, to transmit the secondary video stream over a second channel to a second tuner of the multiple tuner device and to transmit a seamless transition instruction to the multiple tuner device between the primary video stream and the secondary video stream.

The secondary video stream and the primary video stream are different versions of a same content.

The secondary video stream and the primary video stream differ from each other by at least one parameter out of bit rate and quality.

Managing Transmitter Arrays

FIG. 10 illustrates a method 1000 for managing multiple transmitters, according to an embodiment of the invention.

Method 1000 starts by stage 1010 of receiving an instruction to transmit multiple video streams according to a current allocation scheme. The allocation scheme determines which video streams are transmitted by each transmitter and the channels (physical channels, frequency ranges) over which the video streams should be transmitted.

Stage 1010 is followed by stage 1020 of transmitting multiple video streams according to the current allocation scheme by multiple transmitters.

Stage 1020 is followed by stage 1030 of receiving an instruction to transmit multiple video streams according to a next allocation scheme so that a primary video stream transmitted over a first channel by a first transmitter will be replaced by a secondary video stream that is transmitted over a second channel by a second transmitter.

Stage 1030 is followed by stage 1040 of transmitting multiple video streams according to the next allocation scheme by the multiple transmitters.

Stage 1040 is followed by stage 1050 of instructing a system that is coupled to a multiple tuner device to transmit the primary video stream over the first channel to a first tuner of the multiple tuner device, to transmit the secondary video stream over a second channel to a second tuner of the multiple tuner device and to transmit a seamless transition instruction to the multiple tuner device between the primary video stream and the secondary video stream.

Figure 11:
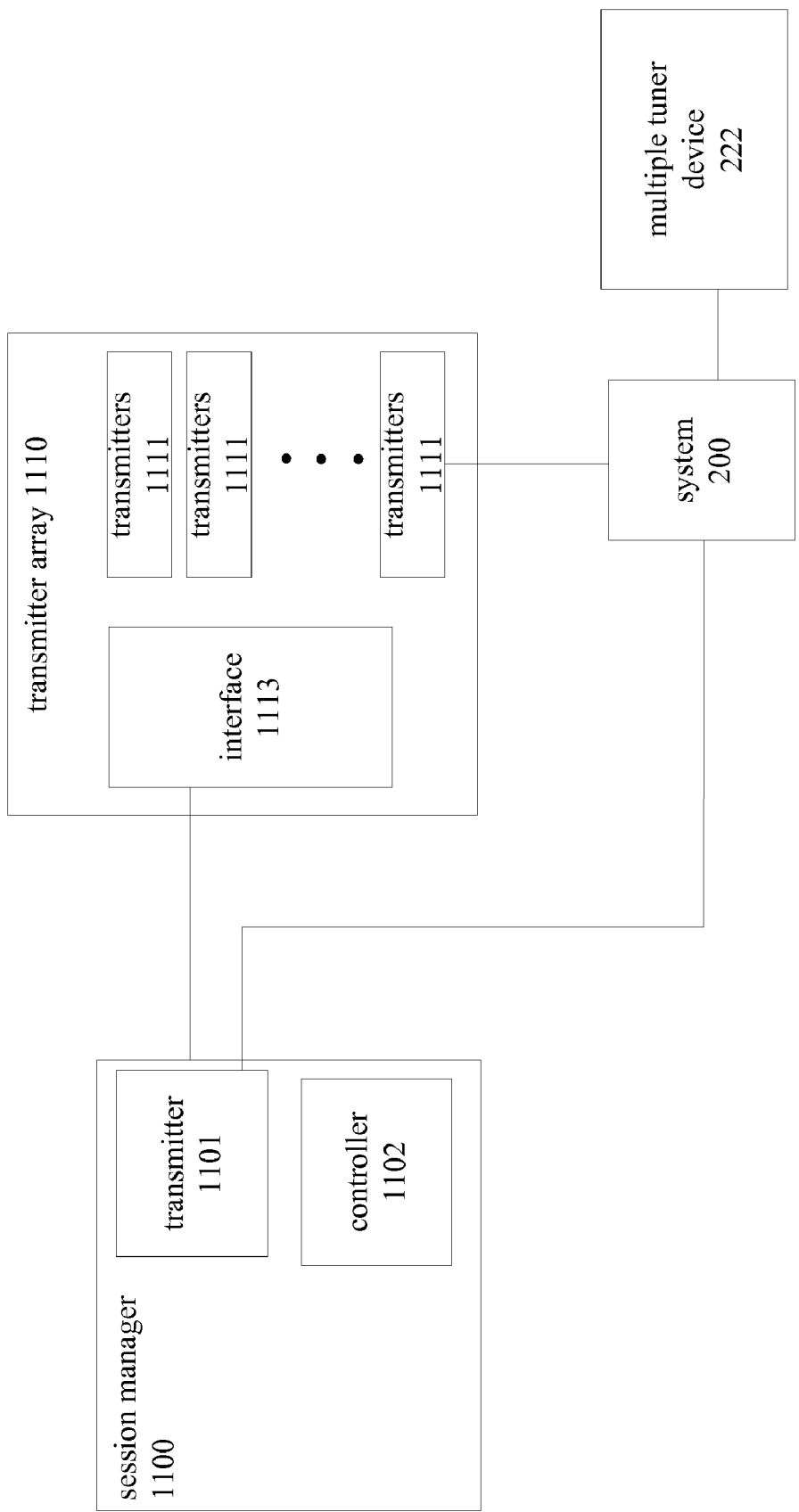
FIG. 11 is a block diagram that illustrates a session manager, according an embodiment of the invention.

FIG. 11 illustrates a session manager 1100, transmitter array 1110 that includes multiple transmitters 1111, a system 200 and a multiple tuner device 222 according to an embodiment of the invention.

Multiple transmitters 1110 form a transmitter array. They can be terms edge transmitters and may apply QAM modulation or any other modulation. They output radio frequency (RF) signals that are sent over an RF network to devices such as multiple tuner device 222.

Session manager 1100 can be located in a headend facility but this is not necessarily so. It may be connected by a fiber network to multiple hubs such as transmitter array 1110 that includes the multiple transmitters 1111. Session manager 1100 can be connected to multiple hubs and determine the content transmitted by multiple transmitter arrays.

Session manager 1100 includes a transmitter 1101 for transmitting instructions to multiple transmitters that instruct the multiple transmitters to transmit multiple video streams according to a current allocation scheme and a controller 1102 for changing the current allocation scheme to provide a next allocation scheme so that a primary video stream transmitted over a first channel by a first transmitter will be replaced by a secondary video stream that is transmitted over a second channel by a second transmitter.

The transmitter 1101 is further configured to transmit instructions to multiple transmitters 1100 that instruct the multiple transmitters to transmit multiple video streams according to the next allocation scheme.

The transmitter 1101 is further configured to transmit instructions to a system 200 that is coupled to a multiple tuner device 222 and instruct the system 200 to transmit the primary video stream over the first channel to a first tuner of the multiple tuner device 200, to transmit the secondary video stream over a second channel to a second tuner of the multiple tuner device and to transmit a seamless transition instruction to the multiple tuner device between the primary video stream and the secondary video stream.

Transmitter array 1110 includes an interface 1113 for receiving an instruction to transmit multiple video streams according to a current allocation scheme and multiple transmitters 1111 for transmitting multiple video streams according to the current allocation scheme.

Interface 1113 is further configured to receive an instruction to transmit multiple video streams according to a next allocation scheme so that a primary video stream transmitted over a first channel by a first transmitter will be replaced by a secondary video stream that is transmitted over a second channel by a second transmitter;

Multiple transmitters 1111 are further configured to transmit multiple video streams according to the next allocation scheme.

At least one transmitter of the multiple transmitters 1111 is configured to transmit instructions to a system 200 that is coupled to a multiple tuner device 222 and instructs the system 200 to transmit the primary video stream over the first channel to a first tuner of the multiple tuner device, to transmit the secondary video stream over a second channel to a second tuner of the multiple tuner device and to transmit a seamless transition instruction to the multiple tuner device between the primary video stream and the secondary video stream.

Transmitting Video Streams in an Interlaced Manner

A seamless transition between MPEG transport streams involves performing a transition between audio and video streams that are multiplexed together. Each MPEG transport stream is built according to strict timing constraints in order to guarantee that audio buffers and video buffers will not underflow or overflow. The audio streams are built while taking into account a model of audio buffers and the video streams are built while taking into account a model of video buffers.

The video and audio streams that are multiplexed together are built while taking into account different buffer models. As a result, adjacent bits within the MPEG transport stream may be sent to a display (or sent to a speakerphone) at different non-adjacent times.

If a primary MPEG transport stream should be switched to a secondary MPEG transport stream (for example—at an advertisement break point), then transmission of primary video stream access units and primary audio stream access units should stop.

According to an aspect of the invention, the transmission of the primary video stream stops before the beginning of the break—at different video presentation timestamps and different audio presentation timestamps.

The transmission of the new stream includes starting to transmit the secondary content on the second channel or medium multiplexed with those parts of the primary media stream that were not transmitted as part of the secondary media stream.

This way, the streams arriving at the receiver can be concatenated and still create one legal stream.

Conveniently, a transmitter that transmits the two media streams performs a legal splicing so that the multiplexing of the secondary media stream and the primary media stream together yields a legal stream.

Different users can receive different secondary video streams—for example for providing targeted advertisements.

A method for transmitting content is provided, the method starts with receiving a primary media stream and a secondary media stream, wherein each of the media streams includes both audio frames and video frames, wherein any adjacent video frame and audio frame in any of the primary and secondary media streams is associated with different timestamps. That is, any audio frame is not provided within the stream next to a video frame that should be displayed when the audio frame plays. (it is noted that the term frame may be replace by comparable terms such as packets, portions etc, depending on the implementation of the invention and on the video formats used).

The method continues with generating an output secondary media stream, wherein the output secondary media stream includes at least one frame of the primary media stream, wherein usually the output secondary media stream includes at least one audio frame of the primary media stream.

Conveniently, the audio frames that are taken from the primary media stream to the output secondary media stream are the first audio frames of the output secondary media stream, and those frames are usually separated by the first video frames of the secondary media stream. Usually the audio frames taken from the primary media stream are the first audio frames following a cut off point that is selected for interchanging between a primary media stream and a secondary media stream.

It is noted that, according to an embodiment of the invention, the generating includes generating multiple different output secondary streams (for example—different advertisements) from multiple different incoming advertising streams, but using a single primary stream (e.g. for sending different advertisement to different clients).

The method usually also includes providing the incoming primary stream to a remote system, usually until the cut-off point, and providing the output advertising stream. It is noted that the stages of generating and providing may be carried out by a single system (usually by to different units thereof), or by multiple systems that may be directly or indirectly connected to each other (e.g. over the Internet), and may be either located in a single site or remotely from each other (E.g. a headend and a hub).

Figure 12:
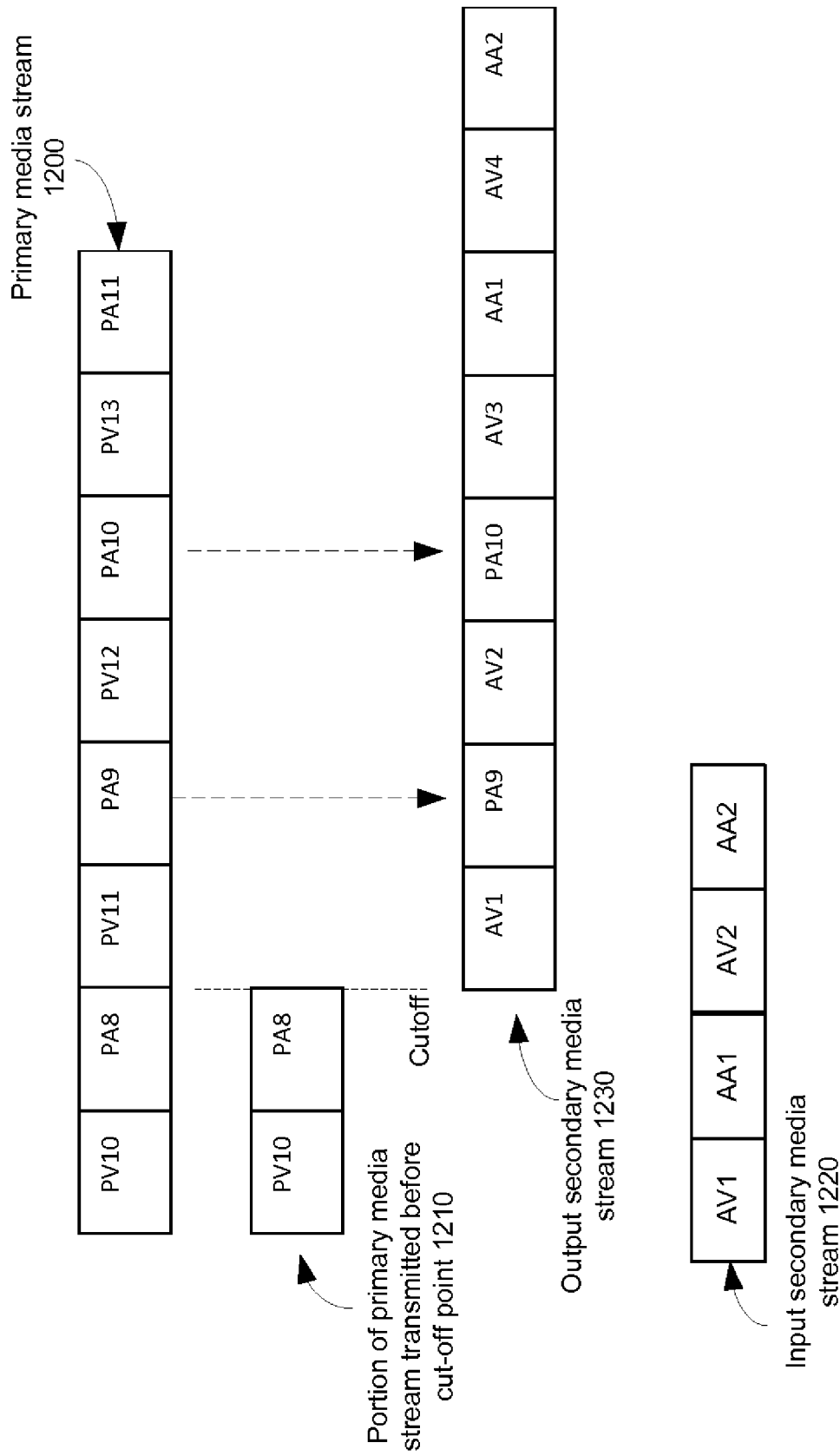
FIG. 12 illustrates a primary media stream, a segment of the primary media stream that is transmitted before the cut off, an input secondary stream and an output secondary media stream, according an embodiment of the invention.

FIG. 12 illustrates various media streams according to an embodiment of the invention.

FIG. 12 illustrates primary media stream 1200, a segment 1210 of the primary media stream that is transmitted before the cut off, an input secondary stream 1220 and an output secondary media stream 1230.

Primary media stream 1200 includes the following interleaved sequence of primary audio and primary video frames: tenth primary video frame (PV10), eighth primary audio frame (PA8), eleventh primary video frame (PV11), ninth primary audio frame (PA9), twelfth eleventh primary video frame (PV12), tenth primary audio frame (PA10), thirteenth twelfth eleventh primary video frame (PV13) and eleventh primary audio frame (PA11).

Input secondary media stream 1220 includes the following interleaved sequence of secondary audio and secondary video frames: first secondary video frame (AV1), first secondary audio frame (AA1), second secondary video frame (AV2), second secondary audio frame (AA2), third secondary video frame (PV3), third secondary audio frame (PA4), firth secondary video frame (PV5) and first secondary audio frame (PA5).

The segment 1210 of the primary media stream that is transmitted before the cut off point includes tenth primary video frame (PV10), eighth primary audio frame (PA8).

The output secondary media stream 1230 that is transmitted after the cut off point includes media and video frames of the input secondary media stream 1220 as well as few (referred to as residual) primary audio frames—ninth primary audio frame (PA9) and tenth primary audio frame (PA10). These are the primary audio frame that directly follow the last primary audio frame of the portion 1210 that was transmitted before the cut-off point.

The residual audio frames of the primary media stream are the first media frames of the output secondary media stream 1230. The residual audio frame and the video frames of the secondary media stream are arranged in an interlacing manner.

Figure 13:
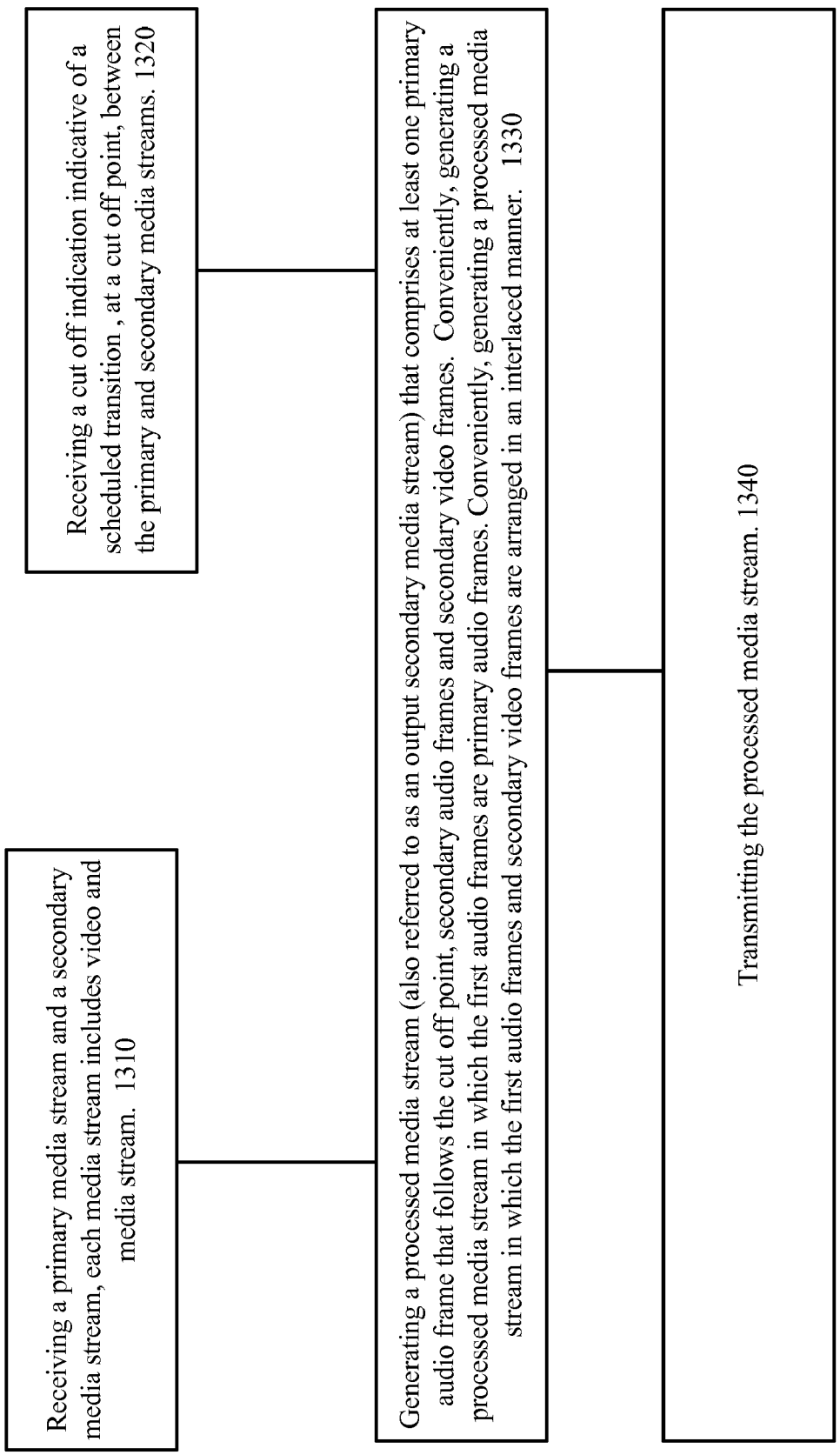
FIG. 13 illustrates a method for generating an output media stream, according to an embodiment of the invention.

FIG. 13 illustrates a method 1300 for generating an output media stream, according to an embodiment of the invention.

Method 1300 starts by stages 1310 and 1320.

Stage 1310 includes receiving a primary media stream and a secondary media stream, each media stream includes video and media stream.

Stage 1320 includes receiving a cut off indication indicative of a scheduled transition, at a cut off point, between the primary and secondary media streams.

Stages 1310 and 1320 are followed by stage 1330 of generating a processed media stream (also referred to as an output secondary media stream) that comprises at least one primary audio frame that follows the cut off point, secondary audio frames and secondary video frames.

Stage 1330 can include generating a processed media stream in which the first audio frames are primary audio frames.

Stage 1330 can include generating a processed media stream in which the first audio frames and secondary video frames are arranged in an interlaced manner.

Stage 1330 is followed by stage 1340 of transmitting the processed media stream.

Method 1300 can be added to any of the mentioned above methods. The secondary video stream that is transmitted by any of the previously systems (for example system 200 of FIG. 1) can include primary audio frames—as illustrated by FIGS. 12 and 13.

Thus, receiver 210 of system 100 can be configured to receive a secondary media stream, a primary media stream and a cut off indication indicative of a scheduled transition, at a cut off point, between the primary and secondary media streams.

The video processor 220 of system 200 can be configured to generate a processed media stream that includes at least one primary audio frame that follows the cut off point, secondary audio frames and secondary video frames. The transmitter 230 of system 200 is configured to transmit the processed media stream.

Alternatively, a system is provides that includes: a receiver for receiving a secondary media stream, a primary media stream and a cut off indication indicative of a scheduled transition, at a cut off point, between the primary and secondary media streams; a video processor, for generating a processed media stream that comprises at least one primary audio frame that follows the cut off point, secondary audio frames and secondary video frames; and a transmitter for transmitting the processed media stream.

The system can execute any stages of method 1300. Thus, the system can generate a processed media stream in which the first audio frames are primary audio frames. Additionally or alternatively, the system can generate a processed media stream in which the first audio frames and secondary video frames are arranged in an interlaced manner.

It is noted that the streams may be provided between two such systems encapsulated in a different protocol packets (e.g. when being transmitted over the internet). It is noted that the incoming primary streams and the incoming advertising stream may be received using the same channel or not, and that the output advertising stream and the provided primary stream are usually provided over different channels (even though this is not necessarily so). All of the media stream are usually MPEG stream, but this is not necessarily so, and the invention can easily be implemented for other video standards as well.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for facilitating transitions between video streams, the method comprising:
    receiving a primary video stream that comprises a first primary video stream portion and a second primary video stream portion, wherein the second stream portion follows the first video stream portion;
    receiving a secondary video stream;
    processing at least one of the primary video stream and the secondary video stream to facilitate a seamless transition, at a multiple tuner device, between the first primary video stream portion and the secondary video stream;
    transmitting the primary video stream to a first tuner of the multiple tuner device over a first physical channel;
    transmitting the secondary video stream to a second tuner of the multiple tuner device over a second physical channel that differs from the first physical channel;
    wherein the primary video stream and secondary video stream are a same version of a same program;
    instructing the multiple tuner device to perform a seamless transition between the first primary video stream portion to the secondary video stream;
    wherein the processing comprises marking a first packet of a video frame of the primary video stream as a first synchronization point if the video frame has a same program clock reference (PCR) value and a same presentation time stamp (PTS) value as a frame of the secondary video stream.

2. The method according to claim 1 wherein the primary video stream comprises a first synchronization point and the secondary video stream comprises a second synchronization point; wherein the method comprises instructing the multiple tuner device to perform the seamless transition if the multiple tuner device detects the first and second synchronization points.

3. The method according to claim 1 comprising transmitting the secondary video stream substantially in parallel to the transmitting of the second primary video stream portion; and preventing a transmission of video content to the second tuner before starting the transmitting of the secondary video stream.

4. The method according to claim 1 comprising monitoring an availability of tuners of the multiple tuner.

5. The method according to claim 1 wherein the second primary video stream portion is targeted to a user of the multiple tuner device; and wherein the secondary video stream is targeted to another user.

6. The method according to claim 1 comprising:
receiving a primary video stream that comprises the first and second primary video stream portions and a third primary video stream portion, wherein the third primary video stream portion follows the second primary video stream portion;
receiving the secondary video stream;
processing at least one of the primary video stream and the secondary video stream to facilitate a seamless transition, at a multiple tuner device, between the first primary video stream portion and the secondary video stream and facilitates a seamless transition, at the multiple tuner device, between the secondary video stream and the third primary video stream portion;
transmitting the primary video stream to the first tuner of the multiple tuner device;
transmitting the secondary video stream to the second tuner of the multiple tuner device;
instructing the multiple tuner device to perform a seamless transition between the first primary video stream portion to the secondary video stream; and
instructing the multiple tuner device to perform a seamless transition between the secondary video stream to the third primary video stream portion.

7. A system for facilitating transitions between video streams, the system comprising:
a receiver to receive a secondary video stream and to receive a primary video stream; the primary video stream comprises a first primary video stream portion and a second primary video stream portion, wherein the second stream portion follows the first video stream portion; wherein the second primary video stream portion and the secondary video stream portion are different versions of a same program;
a video processor to process the primary video stream and the secondary video stream by marking a first packet of a video frame of the primary video stream as a first synchronization point if the video frame has a same program clock reference (PCR) value and a same presentation time stamp (PTS) value as a frame of the secondary video stream; any by marking the frame of the secondary video stream as a second synchronization point;
a transmitter to transmit the primary video stream to a first tuner of the multiple tuner device, for transmitting the secondary video stream to a second tuner of the multiple tuner device and for transmitting a seamless transition instruction to the multiple tuner device, wherein the seamless transition instruction instructs the multiple tuner device to perform a seamless transition between the first primary video stream portion to the secondary video stream.

8. The system according to claim 7 wherein the system is configured to transmit a seamless transition instruction that instructs the multiple tuner device to perform the seamless transition if the multiple tuner device detects the first and second synchronization points.

9. The system according to claim 7 wherein the transmitter is configured to transmit the secondary video stream substantially in parallel to a transmission of the second primary video stream portion; and wherein the system is configured to prevent a transmission of video content to the second tuner before the transmitter starts a transmission of the secondary video stream.

10. The system according to claim 7 wherein the second primary video stream portion and the secondary video stream differ from each other by at least one parameter out of bit rate and quality.

11. The system according to claim 7 wherein the second primary video stream portion is targeted to a user of the multiple tuner device; and wherein the secondary video stream is targeted to another user.

12. The system according to claim 7 wherein the transmitter is arranged to transmit the primary video stream over a first physical channel and to transmit the secondary video stream over a second physical channel that differs from the first physical channel; wherein the primary video stream and secondary video stream are a same version of a same program.

* * * * *